United States Patent
Noda et al.

(10) Patent No.: US 9,373,983 B2
(45) Date of Patent: Jun. 21, 2016

(54) ROTATING ELECTRICAL MACHINE

(71) Applicant: ASMO CO., LTD., Kosai, Shizuoka-pref. (JP)

(72) Inventors: Takeo Noda, Hamamatsu (JP); Tsuyoshi Kinoshita, Hamamatsu (JP)

(73) Assignee: ASMO CO., LTD., Shizuoka-pref. (JP)

( * ) Notice: Subject to any disclaimer, the term of this patent is extended or adjusted under 35 U.S.C. 154(b) by 301 days.

(21) Appl. No.: 14/150,766

(22) Filed: Jan. 9, 2014

(65) Prior Publication Data

US 2014/0197708 A1 Jul. 17, 2014

(30) Foreign Application Priority Data

Jan. 11, 2013 (JP) ................................ 2013-003720

(51) Int. Cl.
*H02K 29/03* (2006.01)
*H02K 1/27* (2006.01)

(52) U.S. Cl.
CPC .............. *H02K 1/2786* (2013.01); *H02K 29/03* (2013.01)

(58) Field of Classification Search
CPC .............................. H02K 1/2786; H02K 29/30
USPC ............. 310/156.38, 156.21, 154.08, 154.21, 310/154.22, 154.28, 154.29, 154.36
See application file for complete search history.

(56) References Cited

U.S. PATENT DOCUMENTS

| | | | |
|---|---|---|---|
| 2004/0251760 A1* | 12/2004 | Tanaka | H02K 23/04 310/154.06 |
| 2005/0275301 A1* | 12/2005 | Moriya | H02K 23/04 310/156.45 |
| 2008/0073995 A1* | 3/2008 | Niguchi | H02K 29/03 310/216.001 |
| 2008/0157619 A1* | 7/2008 | Wu | H02K 29/03 310/156.48 |
| 2011/0068652 A1* | 3/2011 | Qin | H02K 1/2766 310/156.53 |

FOREIGN PATENT DOCUMENTS

| | | |
|---|---|---|
| JP | 2005-20914 A | 1/2005 |
| JP | 2012-120306 A | 6/2012 |
| JP | 5183601 B2 | 4/2013 |

* cited by examiner

*Primary Examiner* — Terrance Kenerly
(74) *Attorney, Agent, or Firm* — SOLARIS Intellectual Property Group, PLLC

(57) ABSTRACT

A rotating electrical machine comprising an armature; a yoke; and a plurality of magnets arrayed in a ring shape along an inner peripheral face of the yoke. The magnets are respectively formed in circular arc shapes fit with the inner peripheral face of the yoke, and are fixed to the yoke. The magnets are arrayed along the circumferential direction of the yoke with gaps between each other, a central portion in a circumferential direction of each of the magnets is disposed so as to be opposed in a yoke diameter direction to the gap between other magnets arrayed adjacent to each other, a boundary portion between a pair of magnetic poles in each of the magnets is positioned at central position in the circumferential direction of each of the magnets, and each of the magnets is formed thicker at end portions than at the central portion in the circumferential direction thereof.

8 Claims, 9 Drawing Sheets

ROTATING ELECTRICAL MACHINE

CROSS-REFERENCE TO RELATED APPLICATION

This application is claims priority under 35 USC 119 from Japanese Patent Application, No. 2013-003720 filed Jan. 11, 2013, the disclosure of which is incorporated by reference herein.

BACKGROUND OF THE INVENTION

1. Technical Field

The present invention relates to a rotating electrical machine.

2. Related Art

In existing technology, as illustrated for example in Japanese Patent Application Laid-Open (JP-A) No. 2012-120306, a known rotating electrical machine is provided with an armature, a yoke that houses the armature, and plural magnets that are disposed in a ring shape around the inner peripheral face of the yoke. In such a rotating electrical machine, the plural magnets are respectively formed in circular arc shape which fits with the inner peripheral surface of the yoke, and attached to the inner peripheral surface of the yoke. Moreover, generally in each of the magnets, the pair of magnetic poles is aligned in a row along the circumference of the yoke, with the boundary portion of the pair of magnetic poles set at the circumferential direction central portion of the magnet.

The plural magnets are arrayed along the yoke circumferential direction with gaps between each other, with a circumferential direction central portion of one magnet (a portion on the circumferential direction center side) disposed so as to be opposed in the yoke diameter direction to a gap between other adjacent magnets. Moreover, a boundary of a pair of magnetic poles in the magnets is positioned at a circumferential direction central position (center) of each of the magnets, with the magnets formed with a constant thickness spanning along their entire circumferential direction lengths.

SUMMARY

However, in the above rotating electrical machine, the circumferential direction central portion of each of the magnets is disposed so as to be opposed in the yoke diameter direction to a gap between other adjacent magnets, and the magnets are formed with a uniform thickness spanning along their entire circumferential direction lengths. Thus during operation of the rotating electrical machine, with respect to the armature, differences arises in the surface magnetic flux density between when the magnetic poles switch at the circumferential direction central portion of the magnets and when the magnetic poles switch at the circumferential direction end portions of the magnets. There is accordingly a concern regarding exciting force generated that may cause noise accompanying the differences between these surface magnetic flux densities.

In consideration of the above issue, the present invention provides a rotating electrical machine capable of reducing exciting force.

In order to address the above issue, a rotating electrical machine of the first exemplary embodiment of the present invention includes: an armature; a yoke that is formed in a circular cylindrical shape and that is provided at a radial direction outer side of the armature; plural magnets that are arrayed in a ring shape along an inner peripheral face of the yoke, that are respectively formed in circular arc shapes that fit with the inner peripheral face of the yoke, and that are fixed to the inner peripheral face of the yoke. The plural magnets are arrayed along the circumferential direction of the yoke with gaps between each other, a central portion in a circumferential direction of each of the magnets is disposed so as to be opposed in the yoke diameter direction to the gap between other magnets arrayed adjacent to each other, a boundary portion between a pair of magnetic poles in each of the magnets is positioned at a central position in the circumferential direction of each of the magnets, and each of the magnets is formed thicker at its circumferential direction end portions than at its circumferential direction central portion.

According to such a rotating electrical machine, each of the magnets is formed thicker at the circumferential direction end portions than at the circumferential direction central portion. Consequently, during operation of the rotating electrical machine, with respect to the armature, a difference in surface magnetic flux density can be suppressed from occurring between when the magnetic poles switch at the circumferential direction central portion of the magnets and when the magnetic poles switch at the circumferential direction end portions of the magnets. This thereby enables generation of exciting force that may cause noise to be suppressed.

A rotating electrical machine of a second aspect of the present invention is the rotating electrical machine of the first aspect, wherein: the magnets are formed thicker at the circumferential direction end portions than at the circumferential direction central portion by forming a flat face to a circumferential direction central portion of an outer peripheral portion of each of the magnets so as to extend along a direction parallel to a tangential direction to the yoke.

According to this rotating electrical machine, the circumferential direction end portions can be made thicker than the circumferential direction central portions of the magnets by using a simple configuration in which the flat faces are formed to circumferential direction central portions of the outer peripheral portions of the magnets so as to extend along a direction parallel to a tangential direction to the yoke.

A rotating electrical machine of a third aspect of the present invention is the rotating electrical machine of the first aspect, wherein: the magnets are formed thicker at the circumferential direction end portions than at the circumferential direction central portion by setting a curvature of an inner peripheral portion of the magnets larger than a curvature of an outer peripheral portion of the magnets.

According to this rotating electrical machine, the circumferential direction end portions can be made thicker than the circumferential direction central portions of the magnets by using a simple configuration in which the curvature of the inner peripheral portion of the magnets is set larger than the curvature of the outer peripheral portion of the magnets.

A rotating electrical machine of a fourth aspect of the present invention is the rotating electrical machine of the first aspect, wherein: the magnets are formed thicker at the circumferential direction end portions than at the circumferential direction central portion by forming a flat face to a circumferential direction central portion of an outer peripheral portion of each of the magnets so as to extend along a direction parallel to a tangential direction to the yoke and by setting a curvature of an inner peripheral portion of the magnets larger than a curvature of an outer peripheral portion of the magnets.

According to this rotating electrical machine, the circumferential direction end portions can be made thicker than the circumferential direction central portions of the magnets by using a simple configuration in which the flat faces are formed to circumferential direction central portions of the outer peripheral portions of the magnets so as to extend along a direction parallel to a tangential direction to the yoke, and the curvature of the inner peripheral portion of the magnets is set larger than the curvature of the outer peripheral portion of the magnets.

Note that, as in a fifth aspect of the present invention, the number of the plural magnets may be an odd number.

Moreover, as in a sixth aspect of the present invention, the number of poles of the plural magnets may be ten poles, and the number of slots of the armature may be twelve.

Moreover, as in a seventh aspect of the present invention, the number of poles of the plural magnets may be six poles, and the number of slots of the armature may be eighteen.

Moreover, as in an eighth aspect of the present invention, the number of poles of the plurality of magnets may be fourteen poles, and the number of slots of the armature may be twelve.

BRIEF DESCRIPTION OF THE DRAWINGS

Embodiments of the present invention will be described in detail based on the following figures, wherein.

DETAILED DESCRIPTION OF THE INVENTION

First Exemplary Embodiment

Explanation first follows regarding a first exemplary embodiment of the present invention.

Figure 1:
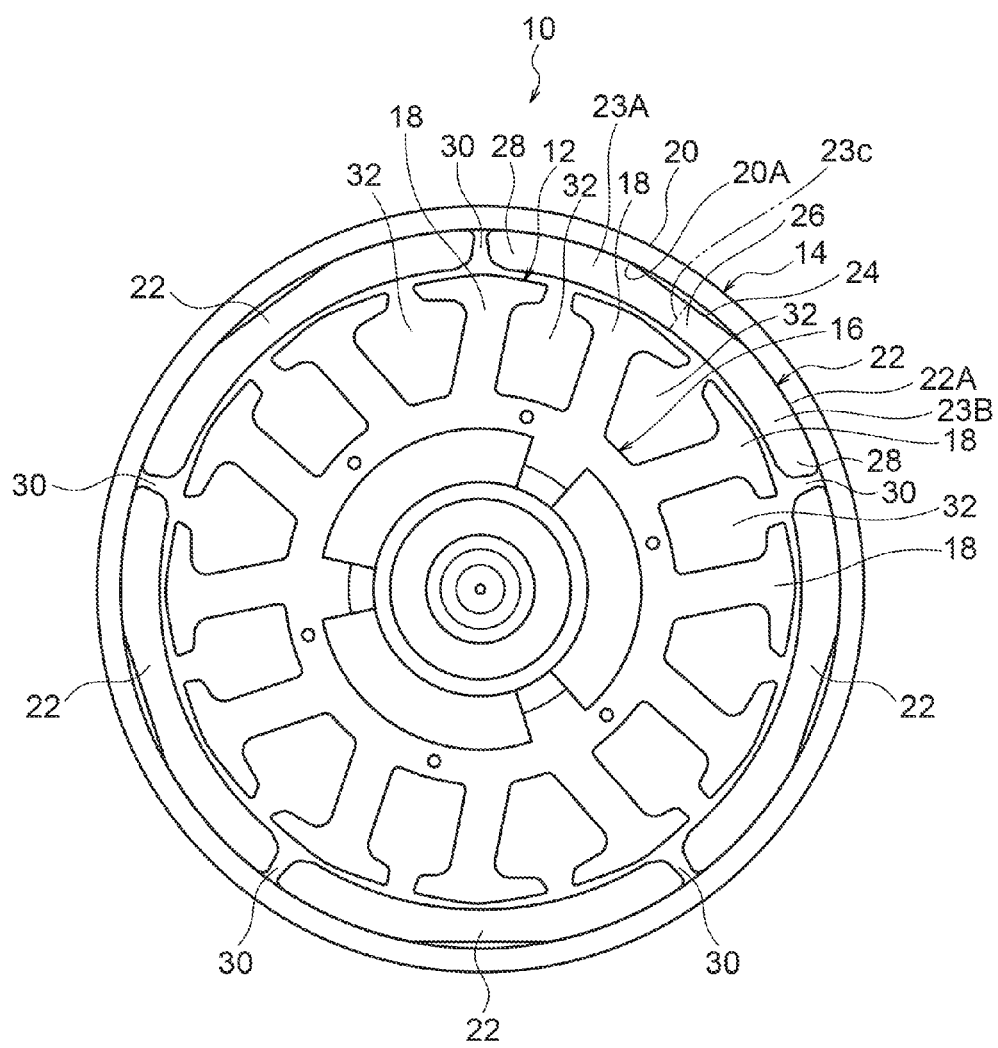
FIG. 1 is a plan view along an axial direction of a rotating electrical machine according to a first exemplary embodiment of the present invention.

A rotating electrical machine 10 according to the first exemplary embodiment of the present invention illustrated in FIG. 1 is, for example, a brushless motor. The rotating electrical machine 10 is equipped with a stator 12 that serves as an armature, and a rotor 14.

The stator 12 includes a stator core 16. The stator core 16 includes plural teeth 18 that extend in a substantially radial direction centered on a central portion of the rotating electrical machine 10. Stator coils are wound on the teeth 18.

The rotor 14 is rotated by a rotating magnetic field formed by the stator 12. The rotor 14 includes a yoke 20 and plural magnets 22. The yoke 20 is formed in a circular cylindrical shape, and is provided at the radial direction outer side of the stator 12.

The plural magnets 22 are arrayed in a ring shape along an inner peripheral face 20A of the yoke 20. The plural magnets 22 are formed in a circular arc shape which fits with the inner peripheral face 20A of the yoke 20, and are fixed to the inner peripheral face 20A of the yoke 20.

A flat face 24 is formed at a central portion in a circumferential direction of an outer peripheral portion 22A of each of the magnets 22 so as to extend along a direction parallel to a tangential direction of the yoke 20. The flat face 24 is formed spanning along an entire length of a longitudinal direction of the magnets 22, this being the same direction as the axial direction of the yoke 20. Due to forming the flat face 24, each of the magnets 22 is formed with end portions 28 in the circumferential direction that are thicker than the central portion 26 in the circumferential direction (see FIG. 2).

The circumferential direction of the magnets 22 is a direction along the circumferential direction of the yoke 20. The circumferential direction central portion 26 of each of the magnets 22 is a portion at the circumferential direction center side of the magnets 22, and the circumferential direction end portions 28 of each of the magnets 22 are portions at the circumferential direction end sides of each of the magnets 22. Each of the magnets 22 includes a pair of magnetic poles 23A, 23B (N pole, S pole) in a row along the circumferential direction of the yoke 20. A boundary portion 23C of the pair of magnetic poles 23A, 23B is positioned at a circumferential direction central position (center) of each of the magnets 22.

The plural magnets 22 are each of the same configuration as each other. The plural magnets 22 are arrayed along the yoke 20 circumferential direction with equal gaps 30 between each other. The circumferential direction central portion 26 of each given magnet 22, formed with the flat face 24, is disposed so as to be opposed in the yoke 20 diameter direction to the gap 30 between other adjacent magnets 22.

In the first exemplary embodiment, the number of the plural magnets 22 is five, as an example of an odd number. The number of the poles of the plural magnets 22 is ten poles, and the number of the slots 32 between the teeth 18 formed to the stator 12 is twelve.

Explanation next follows regarding operation and advantageous effects of the first exemplary embodiment of the present invention.

Figure 3:
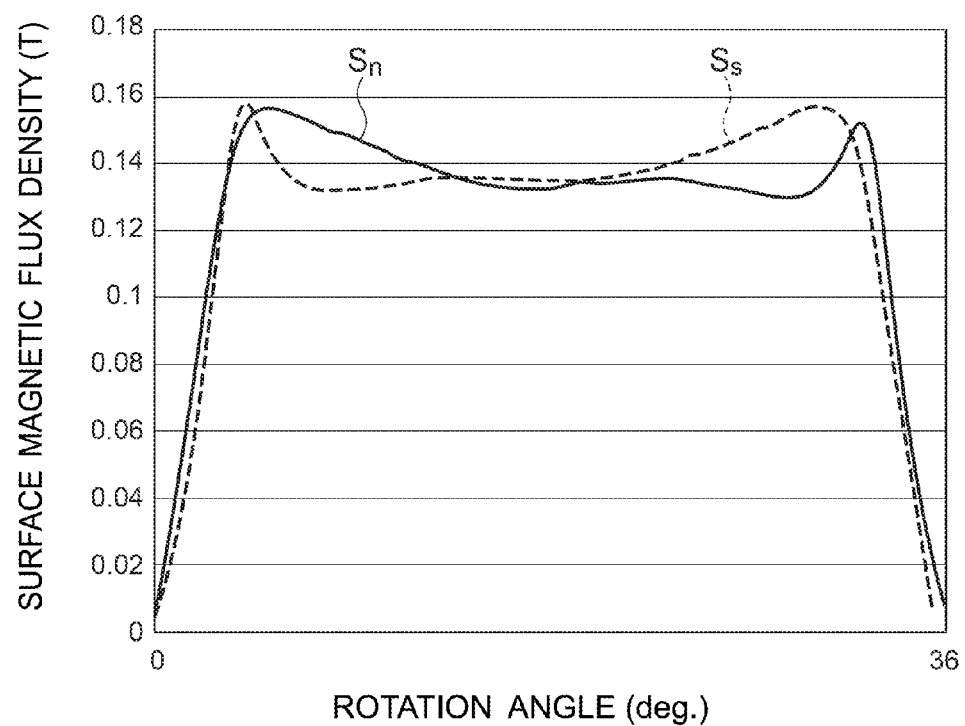
FIG. 3 is graph illustrating measurement results of surface magnetic flux density against rotation angle for the magnet illustrated in FIG. 2.
Figure 8:
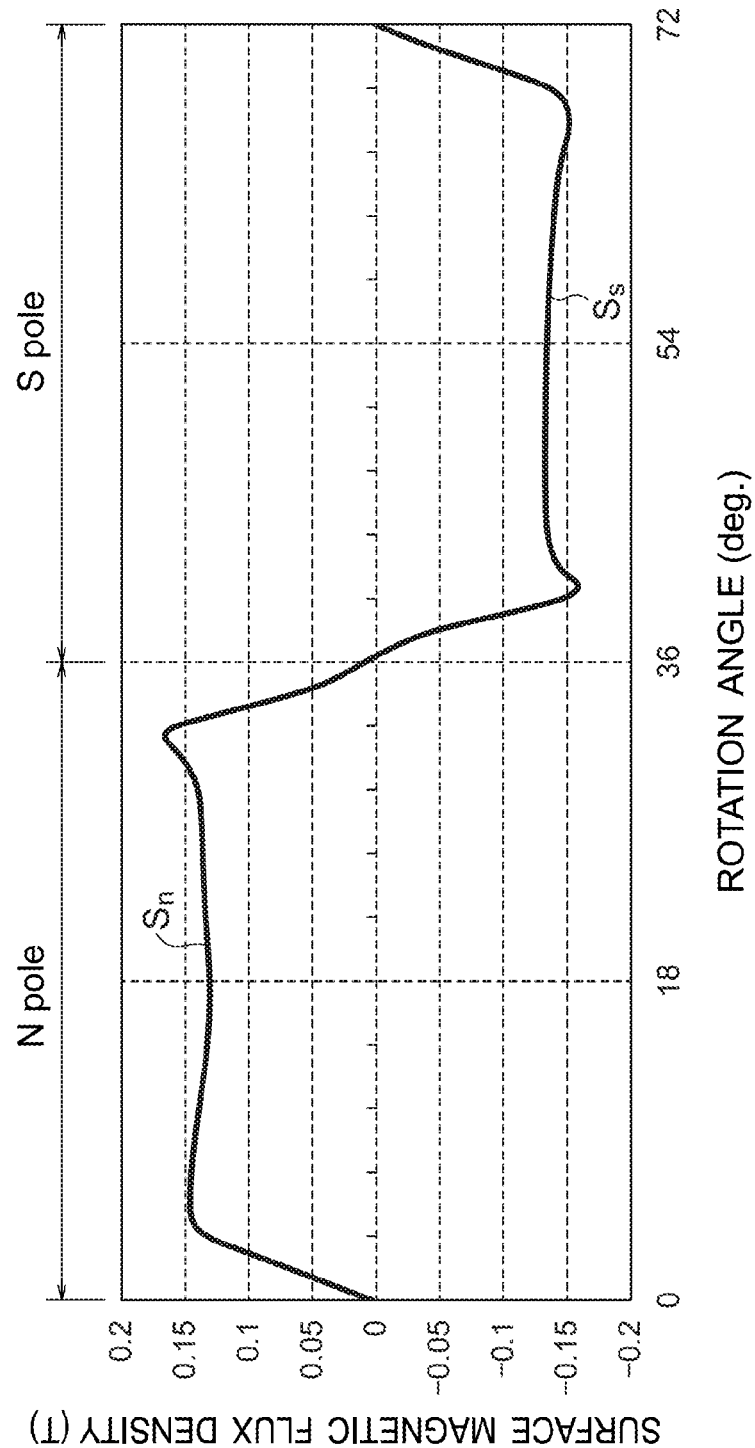
FIG. 8 is a graph illustrating measurement results of surface magnetic flux density against rotation angle for magnets of comparative example.
Figure 9:
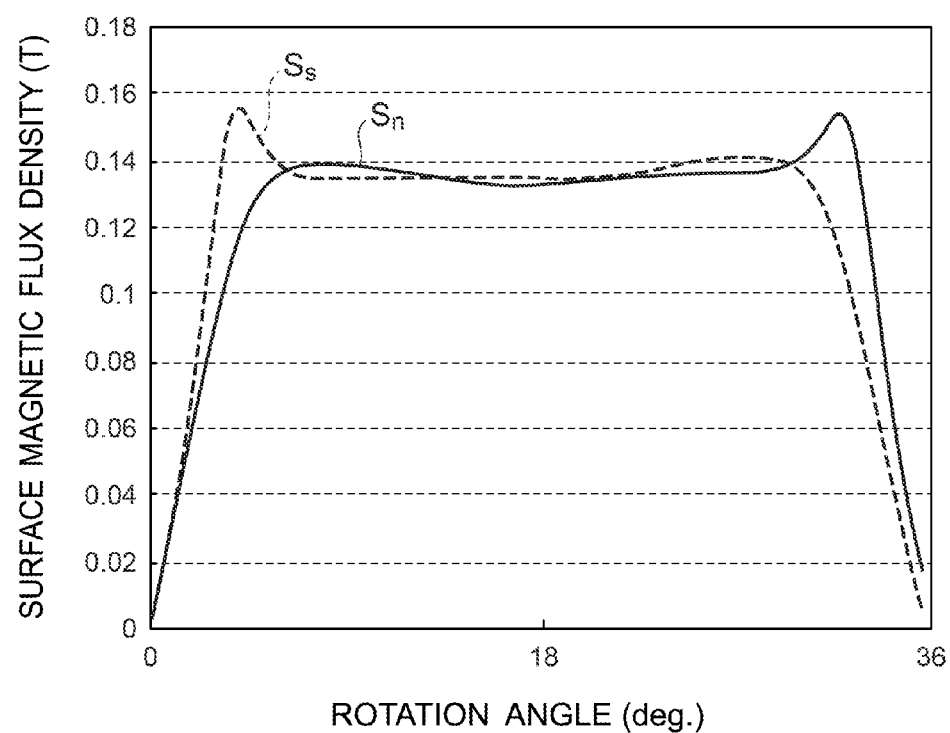
FIG. 9 is a diagram illustrating the N pole waveform and the S pole waveform of FIG. 8 superimposed on each other.

FIG. 3 is a graph illustrating results of surface magnetic flux density measurements against rotation angle regarding the magnets 22 of the present exemplary embodiment. In contrast thereto, FIG. 8 is a graph illustrating results of surface magnetic flux density measurements against rotation angle regarding magnets in Comparative Example. FIG. 9 is a diagram illustrating waveforms of the N pole and waveforms of the S pole of FIG. 8, superimposed on each other. Note that in contrast to the magnets 22 of the present exemplary embodiment, magnets in Comparative Example are formed with the thickness of their circumferential direction central portion and the thickness of their circumferential direction end portions the same as each other.

In other word, the magnets of the Comparative Example are formed with a uniform thickness spanning along the entire length in the circumferential direction, in contrast to the magnets 22 of the present exemplary embodiment. In the Comparative Example, similarly to in the present exemplary embodiment, plural magnets are arrayed with gaps between each other in the yoke circumferential direction, such that the circumferential direction central portion of one magnet is disposed so as to be opposed in the yoke diameter direction to a gap between other adjacent magnets. In the Comparative Example the boundary portion between a pair of magnetic poles in each of the magnets is also placed at a magnet circumferential direction central position.

In a thus configured Comparative Example, the circumferential direction central portion of the magnets are opposed in the yoke diameter direction to respective gaps between adjacent magnets, and the magnets are formed with a uniform thickness along the entire length direction in the circumferential direction. Thus, as illustrated in FIG. 8 and FIG. 9, during rotor rotation, with respect to the stator, a difference in the surface magnetic flux density arises between when the magnetic poles switch at the circumferential direction central portion of the magnets and when the magnetic poles switch at the circumferential direction end portions of the magnets. There is accordingly concern that exciting force that may cause noise is generated accompanying the difference in surface magnetic flux density.

Figure 2:
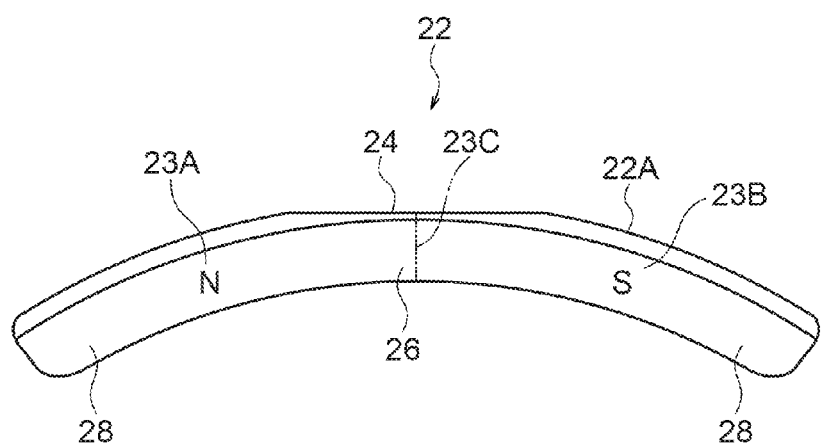
FIG. 2 is a plan view of a magnet of the first exemplary embodiment of the present invention.

In contrast thereto, in the rotating electrical machine 10 according to the first exemplary embodiment of the present invention, as illustrated in FIG. 2, each of the magnets 22 is formed with the circumferential direction end portions 28 thicker than the circumferential direction central portion 26. Thus, as illustrated in FIG. 3, during rotor rotation, with respect to the stator, difference in surface magnetic flux density between when the magnetic poles switch at the magnet circumferential direction central portion and the when magnetic poles switch at the magnet circumferential direction end portions can be suppressed from occurring. Generation of exciting force that may cause noise can accordingly be suppressed. Note that, in the graphs of FIGS. 3, 8 and 9, values at rotation angles of 0 degree and 72 degrees indicate surface magnetic flux densities when the magnetic poles switch at the circumferential direction end portions of the magnets and values at rotation angle of 36 degrees indicate surface magnetic flux densities when the magnetic poles switch at the circumferential direction central portion of the magnets. Further, a line Sn indicates a wave shape of N pole and a line Ss indicates a wave shape of S pole.

As illustrated in FIG. 2, the circumferential direction end portions 28 can be made thicker than the circumferential direction central portion 26 of the magnets 22 by using a simple configuration in which the flat face 24 is formed to the outer peripheral portion 22A at the circumferential direction central portion of each of the magnets 22 so as to extend along a direction parallel to a tangential direction of the yoke 20. An increase in cost can accordingly be suppressed.

Note that in the first exemplary embodiment of the present invention, the rotating electrical machine 10 is applied to a brushless motor, however application may be made to a brushed direct current motor equipped with an armature rotor, and a stator including magnets and a yoke.

Second Exemplary Embodiment

Explanation follows regarding a second exemplary embodiment of the present invention.

Figure 4:
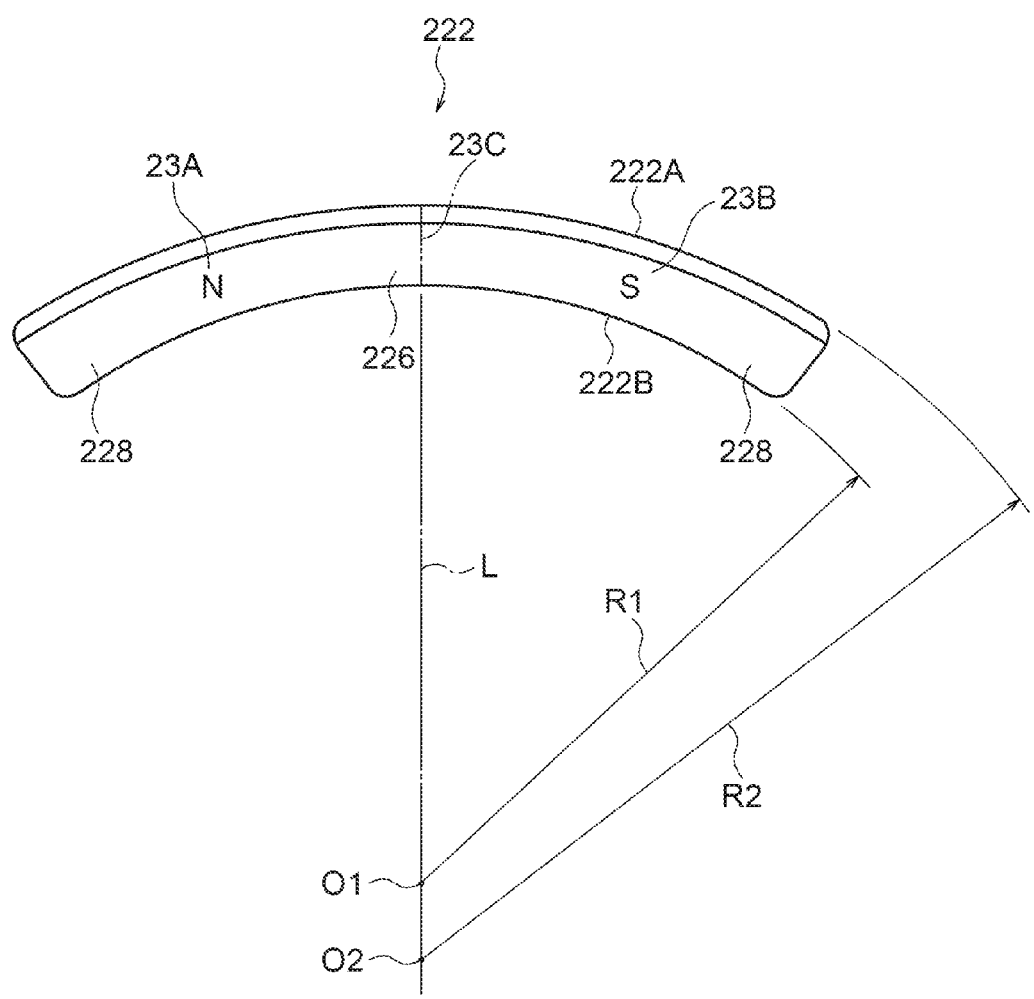
FIG. 4 is a plan view of a magnet in a second exemplary embodiment of the present invention.

In the second exemplary embodiment of the present invention, the configuration of magnets 222 is changed with respect to the first exemplary embodiment in the following manner. Namely, in the second exemplary embodiment illustrated in FIG. 4, a radius R1 of an inner peripheral portion 222B of the magnets 222 is set shorter than a radius R2 of the outer peripheral portion 222A of the magnets 222. The respective centers O1, O2 with respect to the radii R1, R2 are set so as to be positioned at different positions on a hypothetical line L extending along the magnets 222 radial direction and passing through a circumferential direction central position (center) of the magnets 222. Because of this arrangement, a curvature of the inner peripheral portion 222B of the magnets 222 becomes larger than a curvature of the outer peripheral portion 222A of the magnets 222.

Since the curvature of the inner peripheral portion 222B is made larger than the curvature of the outer peripheral portion 222A, in the magnets 222, the circumferential direction end portions 228 are formed thicker than the circumferential direction central portion 226. The flat face 24 described above (see FIG. 2) is omitted from the magnets 222 in the second exemplary embodiment.

Note that configuration other than that described above in the second exemplary embodiment is similar to that of the first exemplary embodiment, the same reference numerals allocated thereto, and explanation thereof omitted.

With such a configuration, similarly to in the above first exemplary embodiment, during rotor rotation, with respect to the stator, differences in surface magnetic flux density when magnetic poles switch at the circumferential direction central portion 226 of the magnets 222, and when magnetic poles switch at the circumferential direction end portions 228 of the magnets 222, can be suppressed from occurring. Thus generation of exciting force that may cause noise can be suppressed.

Moreover, the thickness of the circumferential direction end portions 228 can be made thicker than the circumferential direction central portion 226 of the magnets 222 by using a simple configuration in which the curvature of the inner peripheral portion 222B is made larger than the curvature of the outer peripheral portion 222A in the magnets 222. An increase in cost can accordingly be suppressed.

Third Exemplary Embodiment

Explanation next follows regarding a third exemplary embodiment of the present invention.

Figure 5:
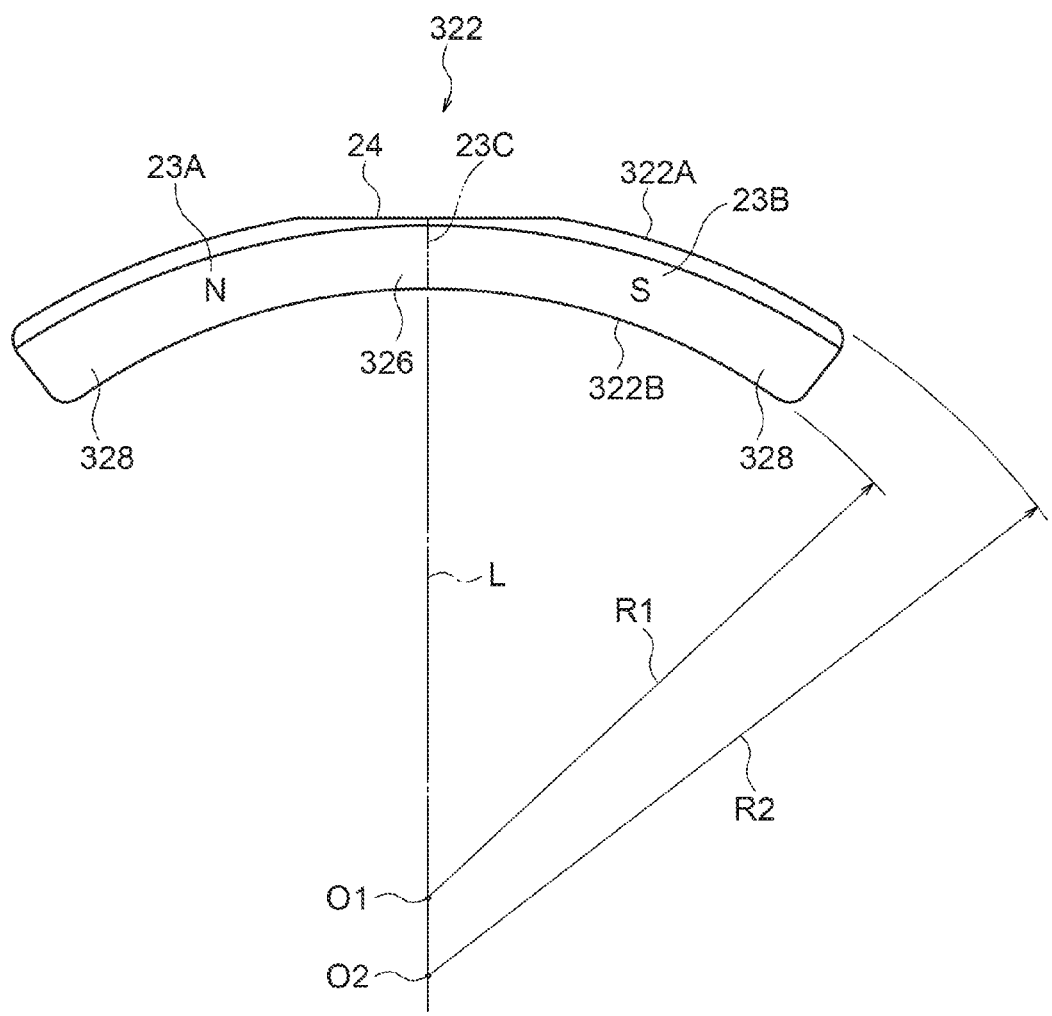
FIG. 5 is a plan view of a magnet in a third exemplary embodiment of the present invention.

In the third exemplary embodiment of the present invention, the configuration of magnets 322 is changed from that of the first exemplary embodiment described above in the following manner. Namely, as illustrated in FIG. 5, in the third exemplary embodiment, similarly to in the first exemplary embodiment, a flat face 24 is formed at circumferential direction central portions of an outer peripheral portion 322A of each of the magnets 322 so as to extend along a direction parallel to a tangential direction of a yoke 20. In the magnets 322, similarly to in the second exemplary embodiment, a curvature of an inner peripheral portion 322B is made larger than a curvature of the outer peripheral portion 322A.

In this manner, in the magnets 322 the thickness of the circumferential direction end portions 328 is formed thicker than the circumferential direction central portion 326 by both forming the flat face 24 at the circumferential direction central portion of the outer peripheral portion 322A of each of the magnets 322 so as to extend along a direction parallel to the tangential direction to the yoke 20, and setting the curvature of the inner peripheral portion 322B is made larger than the curvature of the outer peripheral portion 322A.

Note that in the third exemplary embodiment, configuration other than that described above is similar to that of the first exemplary embodiment and the second exemplary embodiment, the same reference numerals are allocated thereto, and explanation is omitted thereof.

In such a configuration too, similarly to in the first exemplary embodiment and the second exemplary embodiment described above, during rotor rotation, with respect to the stator, a difference in surface magnetic flux density between when the magnetic poles switch at the circumferential direction central portion 326 of the magnets 322, and when the magnetic poles switch at the circumferential direction end portions 328 of the magnets 322, can be suppressed from occurring. Consequently, generation of exciting force that may cause noise can be suppressed.

Moreover, the thickness of the circumferential direction end portions 328 of the magnets 322 can be made thicker than that of the circumferential direction central portion 326 of the magnets 322 using a simple configuration in which the flat face 24 is formed to the outer peripheral portion 322A at the circumferential direction central portion of each of the magnets 322 so as to extend along a direction parallel to the tangential direction of the yoke 20, and the curvature of the inner peripheral portion 322B is made larger than the curvature of the outer peripheral portion 322A in the magnets 322.

Note that the second exemplary embodiment and the third exemplary embodiment of the present invention may also, similarly to in the first exemplary embodiment, be applied to brushed direct current motors.

Moreover, the number of the plural magnets 22 in the above first to third exemplary embodiments is not limited as five.

Figure 6:
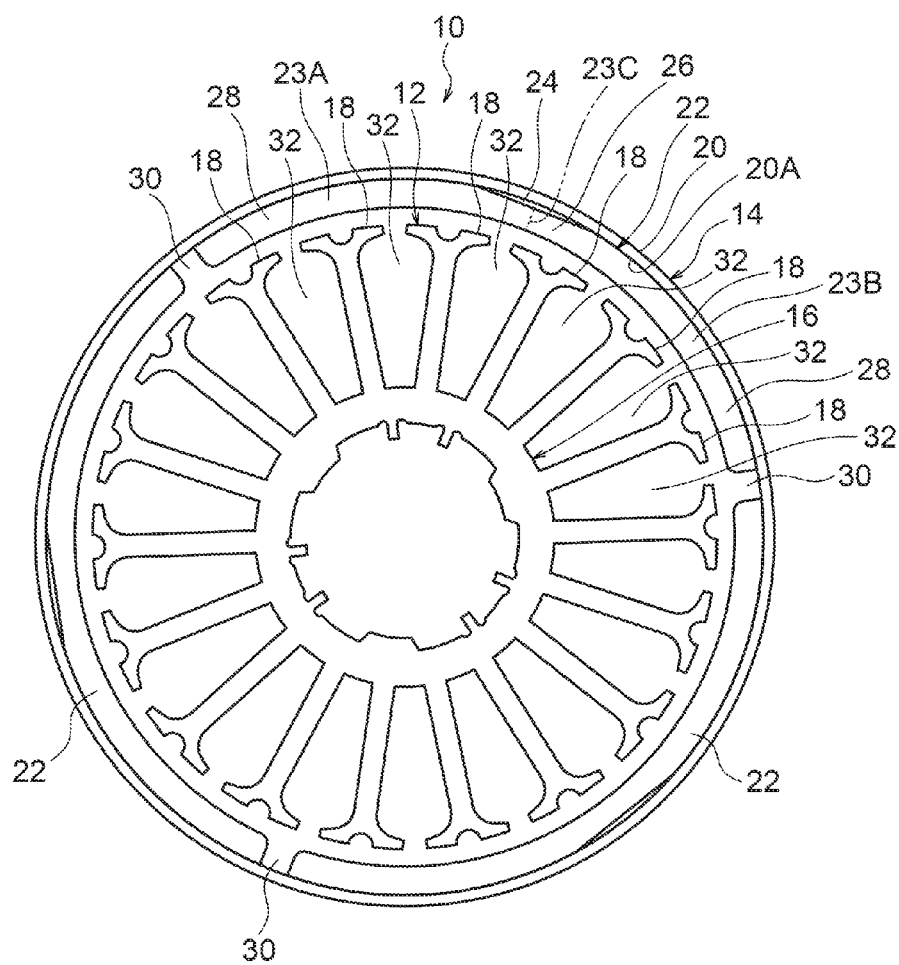
FIG. 6 is a plan view of a rotating electrical machine according to a first modified example.
Figure 7:
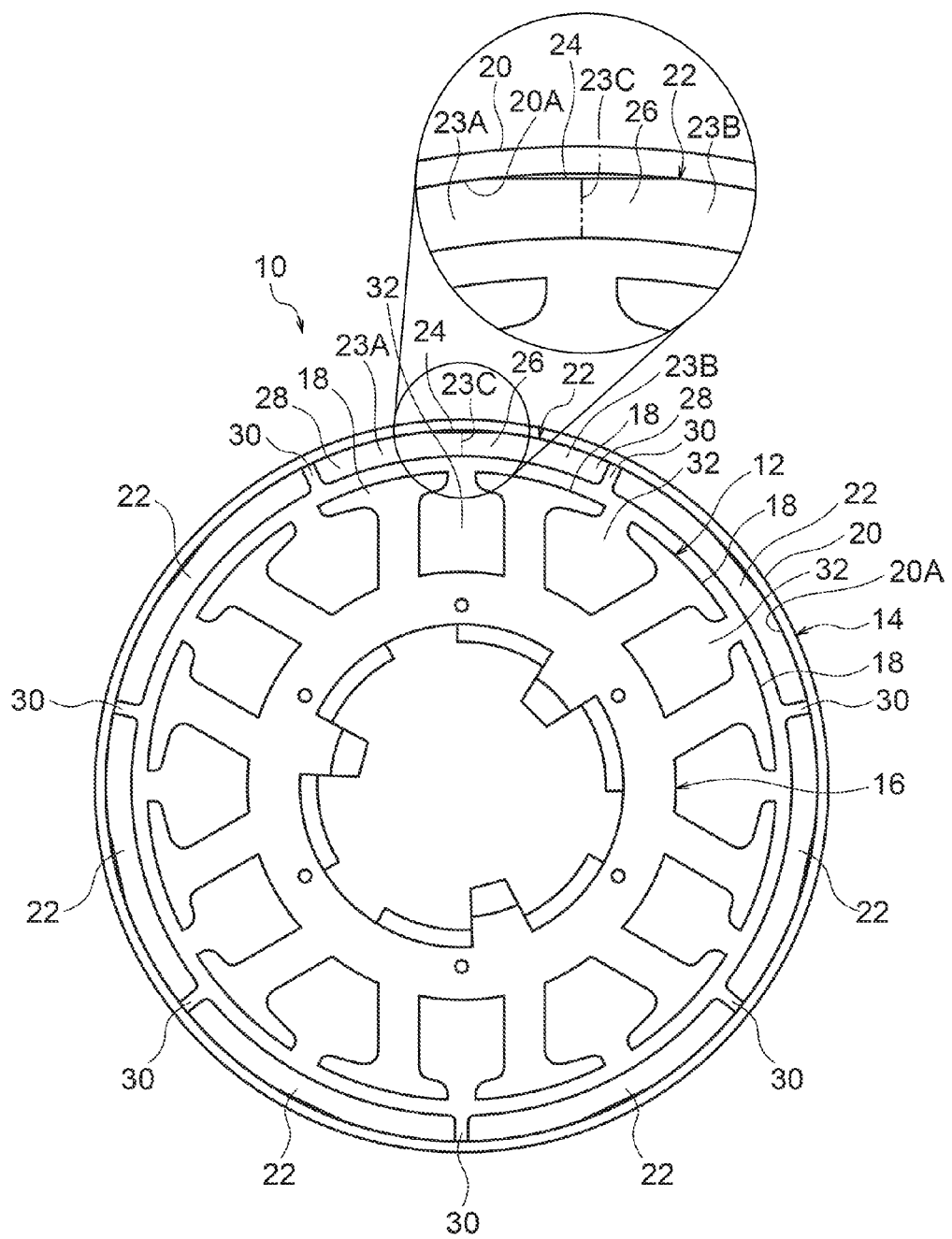
FIG. 7 is a plan view of a rotating electrical machine according to a second modified example.

In the above first to third exemplary embodiments, as for example illustrated in FIG. 6, the number of the plural magnets 22 may be three, the number of the poles of the plural magnets may be six, and the number of slots 32 between the teeth 18 formed to the stator 12 may be eighteen. Moreover, as illustrated in FIG. 7, the number of the plural magnets 22 may be seven, the number of the poles of the plural magnets 22 may be fourteen, and the number of slots 32 between the teeth 18 formed to the stator 12 may be twelve. In the modified examples illustrated in FIG. 6 and FIG. 7, configuration other than that described above is similar to the first and the second exemplary embodiments, is allocated the same reference numerals and further explanation thereof is omitted.

Examples of the present invention have been given above, however the present invention is not limited to the above, and obviously various modifications may be implemented without departing from the scope of the invention.

What is claimed is:

1. A rotating electrical machine comprising:
an armature;
a yoke that is formed in a circular cylindrical shape and that is provided at an outer side in a radial direction of the armature; and
a plurality of magnets that are arrayed in a ring shape along an inner peripheral face of the yoke, that are respectively formed in circular arc shapes that are fit with the inner peripheral face of the yoke, and that are fixed to the inner peripheral face of the yoke, wherein:
the plural magnets are arrayed along the circumferential direction of the yoke with gaps between each other such that adjacent magnets are separated from each other,
a central portion in a circumferential direction of each of the magnets is disposed so as to be opposed in a yoke diameter direction to the gap between other magnets arrayed adjacent to each other, wherein the other adjacent magnets are separated from each other,
a boundary portion between a pair of magnetic poles in each of the magnets is positioned at a central position in the circumferential direction of each of the magnets, and
each of the magnets is formed thicker at end portions in the circumferential direction thereof than at the central portion in the circumferential direction thereof.

2. The rotating electrical machine of claim 1, wherein:
each of the magnets is formed thicker at the circumferential direction end portions than at the circumferential direction central portion by forming a flat face at a circumferential direction central portion of an outer peripheral portion of each of the magnets so as to extend along a direction parallel to a tangential direction to the yoke.

3. The rotating electrical machine of claim 1, wherein:
each of the magnets is formed thicker at the circumferential direction end portions than at the circumferential direction central portion due to a curvature of an inner peripheral portion of each of the magnets being larger than a curvature of an outer peripheral portion of each of the magnets.

4. The rotating electrical machine of claim 1, wherein:
each of the magnets is formed thicker at the circumferential direction end portions than at the circumferential direction central portion by forming a flat face at a circumferential direction central portion of an outer peripheral portion of each of the magnets so as to extend along a direction parallel to a tangential direction to the yoke and due to a curvature of an inner peripheral portion of each of the magnets being larger than a curvature of an outer peripheral portion of each of the magnets.

5. The rotating electrical machine of claim 1, wherein the number of the plurality of magnets is an odd number.

6. The rotating electrical machine of claim 1, wherein the number of poles of the plurality of magnets is ten poles, and the number of slots of the armature is twelve.

7. The rotating electrical machine of claim 1, wherein the number of poles of the plurality of magnets is six poles, and the number of slots of the armature is eighteen.

8. The rotating electrical machine of claim 1, wherein the number of poles of the plurality of magnets is fourteen poles, and the number of slots of the armature is twelve.

* * * * *